US007506836B2

(12) United States Patent
Bloomquist

(10) Patent No.: US 7,506,836 B2
(45) Date of Patent: Mar. 24, 2009

(54) IRREGULAR SURFACED TAPE GUIDE

(75) Inventor: Darrel R. Bloomquist, Meridian, ID (US); Judy Bloomquist, legal representative, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 11/507,725

(22) Filed: Aug. 1, 2006

(65) Prior Publication Data

US 2007/0075181 A1    Apr. 5, 2007

Related U.S. Application Data

(60) Division of application No. 11/231,053, filed on Sep. 20, 2005, now Pat. No. 7,163,175, which is a division of application No. 10/809,013, filed on Mar. 25, 2004, now Pat. No. 6,966,522, which is a continuation of application No. 09/992,717, filed on Nov. 14, 2001, now abandoned.

(51) Int. Cl.
    *G03B 1/46*    (2006.01)

(52) U.S. Cl. .................. 242/615.2; 242/346.2
(58) Field of Classification Search ............. 242/615.2, 242/615.3, 615.4, 346, 346.2; 226/189, 193
    See application file for complete search history.

(56) References Cited

U.S. PATENT DOCUMENTS

| 4,389,010 | A  | * | 6/1983  | Oishi et al. ............... 242/346.2 |
| 4,390,119 | A  | * | 6/1983  | Smetana et al. ........... 242/615.4 |
| 4,910,843 | A  | * | 3/1990  | Lioy et al. .................. 29/895.3 |
| 4,910,844 | A  | * | 3/1990  | Lioy et al. .................. 427/328 |
| 5,479,311 | A  | * | 12/1995 | Doushita et al. ............ 360/132 |
| 6,142,409 | A  | * | 11/2000 | Stewart et al. ........... 242/615.2 |
| 6,966,522 | B2 | * | 11/2005 | Bloomquist et al. ...... 242/615.2 |
| 7,163,175 | B2 | * | 1/2007  | Bloomquist et al. ...... 242/615.2 |

* cited by examiner

*Primary Examiner*—William A Rivera

(57) ABSTRACT

A tape guide that has textured surface over which the tape passes. The textured surface has a surface roughness exceeding the flying height of the tape above the surface. This new irregular surface topography reduces the air bearing and allows limited contact between the tape guide and the tape while minimizing tape distortion that can occur with other surface topographies.

8 Claims, 7 Drawing Sheets

IRREGULAR SURFACED TAPE GUIDE

CROSS REFERENCE TO RELATED APPLICATIONS

This is a divisional application of U.S. patent application having Ser. No. 11/231,053 filed Sep. 20, 2005 now U.S. Pat. No. 7,163,175 which is a divisional of U.S. Pat. No. 6,966,522 having Ser. No. 10/809,013 filed Mar. 25, 2004 which is a continuation of application Ser. No. 09/992,717 filed Nov. 14, 2001 now abandoned.

FIELD OF THE INVENTION

The present invention relates generally to tape drives and, more particularly, to flanged tape guides that have an irregular surface to reduce the air bearing between the tape and the surface of the hub.

BACKGROUND OF THE INVENTION

Information is recorded on and read from a moving magnetic tape with a magnetic read/write head positioned next to the tape. The magnetic "head" may be a single head or, as is common, a series of read/write head elements stacked individually and/or in pairs within the head unit. Data is recorded in tracks on the tape by moving the tape lengthwise past the head. The head elements are selectively activated by electric currents representing the information to be recorded on the tape. The information is read from the tape by moving the tape longitudinally past the head elements so that magnetic flux patterns on the tape create electric signals in the head elements. These signals represent the information stored on the tape.

Data is recorded on and read from each of the parallel tracks on the tape by positioning the head elements at different locations across the tape. That is, head elements are moved from track to track as necessary to either record or read the desired information. Movement of the magnetic head is controlled by an actuator operatively coupled to some type of servo control circuitry. Tape drive head positioning actuators often include a lead screw driven by a stepper motor, a voice coil motor, or a combination of both. The carriage that supports the head is driven by the actuator along a path perpendicular to the direction the tape travels. The head elements are positioned as close to the center of a track as possible based upon the servo information recorded on the tape.

FIG. 1 illustrates generally the configuration of a tape drive 10 typical of those used with single spool tape cartridges. Referring to FIG. 1, a magnetic tape 12 is wound on a single supply spool 14 in tape cartridge 16. Tape cartridge 16 is inserted into tape drive 10 for read and write operations. Tape 12 passes around a first tape guide 18, over a magnetic read/write head 20, around a second tape guide 22 to a take up spool 24. Head 20 is mounted to a carriage and actuator assembly 26 that positions head 20 over the desired track or tracks on tape 12. Head 20 engages tape 12 as tape 12 moves across the face of head 20 to record data on tape 12 and to read data from tape 12. Referring to FIGS. 2 and 3, roller guide 28 includes disc shaped flanges 30 and an annular hub 32. Flanges 30 and hub 32 may be machined as a single integral part or as three separate parts bonded together. In either case, flanges 30 function to keep tape 12 at the proper angle as it passes across head 20. If the tape is presented to the head at too great an angle, then the read and write elements in the head may be misaligned to the data tracks. Flanges 30 are also needed to help keep tape 12 properly packed on take up spool 24.

As the tape is pulled over the guides, a film of air is created between the outside surface 34 of hub 32 and tape 12. This film is often referred to as an air bearing. The air bearing allows the tape to move with low friction very rapidly back and forth between flanges 30. Consequently, high frequency tape movement can occur when the edge of the tape bumps abruptly against flanges 30. Read/write head positioning systems have difficulty following such high frequency tape movement. It would be desirable to reduce this air bearing and thereby increase the friction between the tape and the hub to slow the movement of the tape back and forth between the flanges. Slowing the tape in this manner would allow the head positioning system to better follow the tape as it wanders back and forth between the guide flanges.

One technique that has been used to reduce the air bearing is creating an irregular topography on the surface of the hub. This technique is described in U.S. patent application Ser. No. 09/597,882. In one version of this technique, described in the '882 application, a series of comparatively deep grooves are formed in the surface of the hub to reduce the air bearing. In another version, comparatively high raised areas are formed on the surface of the hub. It has been discovered that these surface topographies can leave imprints on the tape which may, under some conditions, distort or otherwise damage the tape.

SUMMARY OF THE INVENTION

The present invention is directed to a tape guide that has a textured roughness exceeding the flying height of the tape above the surface. This new irregular surface topography reduces the air bearing and allows limited contact between the tape guide and the tape while minimizing tape distortion that can occur with other surface topographies.

Surface texture is the repetitive or random deviation from the nominal surface that forms the three dimensional topography of the surface. Surface texture includes roughness, waviness, lay and flaws as those terms are defined in the American National Standard ANSI/ASME B46.1-1985 which is incorporated herein by reference. Surface roughness consists of the finer irregularities of the surface texture. Surface roughness, for purposes of this Specification and Claims, is measured and quantified by the Roughness Average $R_a$ defined in section 3.9.1 of ANSI/ASME B46.1-1985.

DETAILED DESCRIPTION OF THE INVENTION

Figure 1:
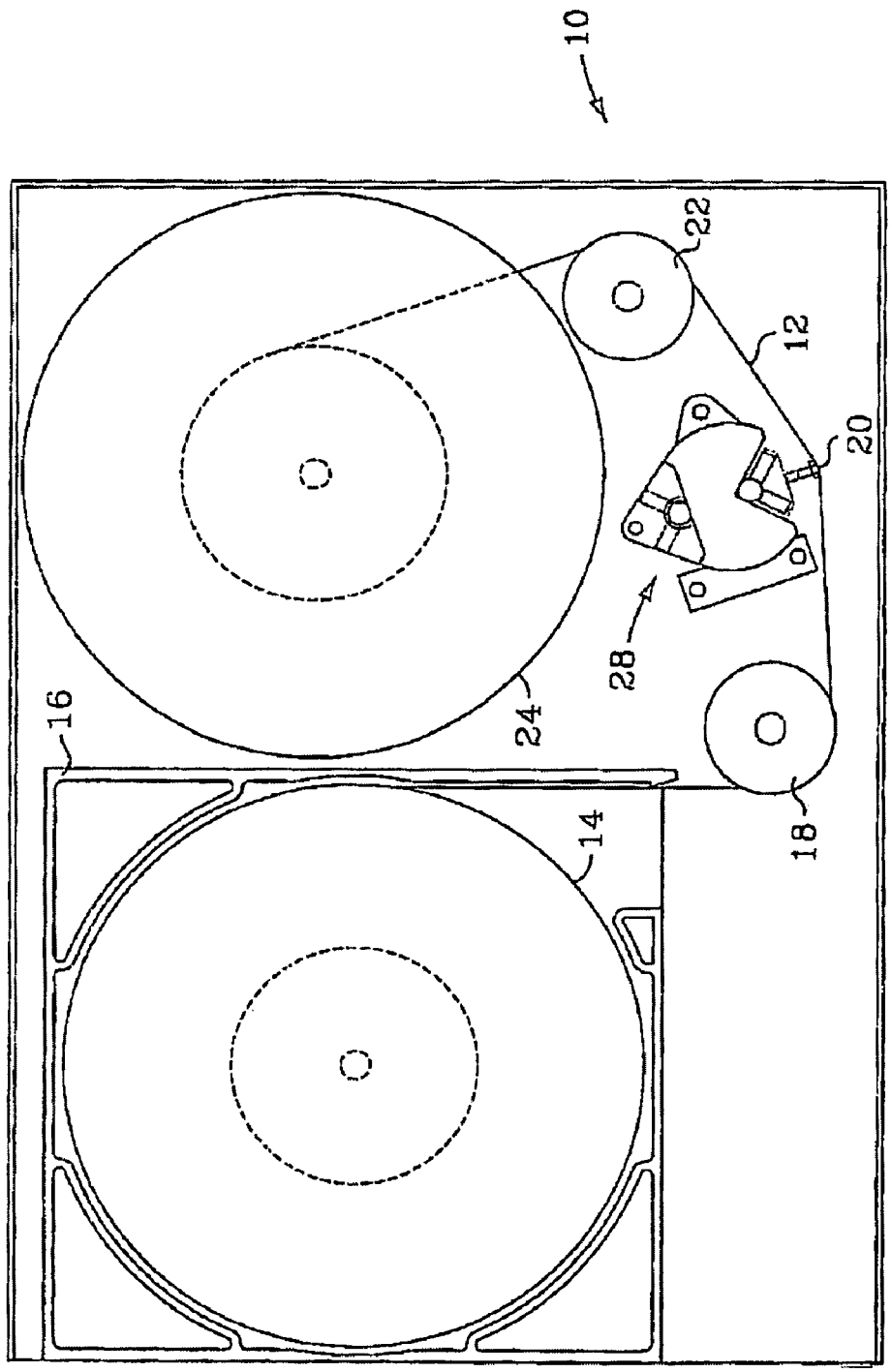
FIG. 1 is a top down plan view of a single spool tape drive.
Figure 3:
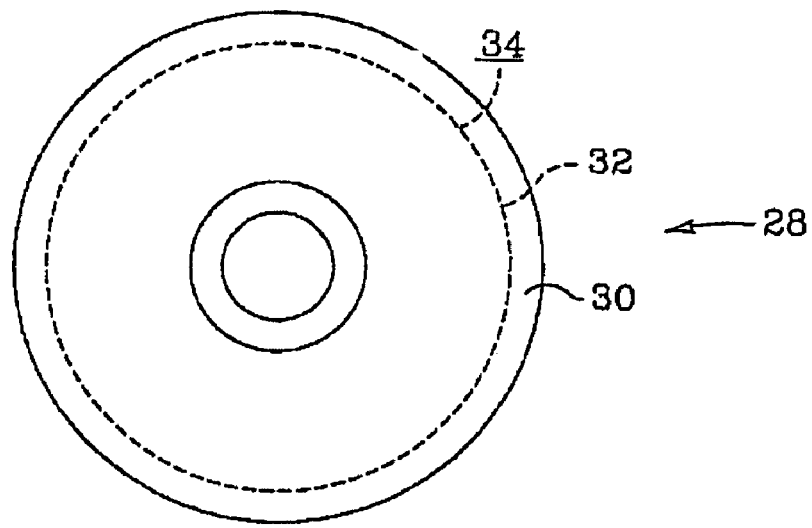
FIGS. 2 and 3 are elevation and plan views of a conventional roller tape guide.
Figure 2:
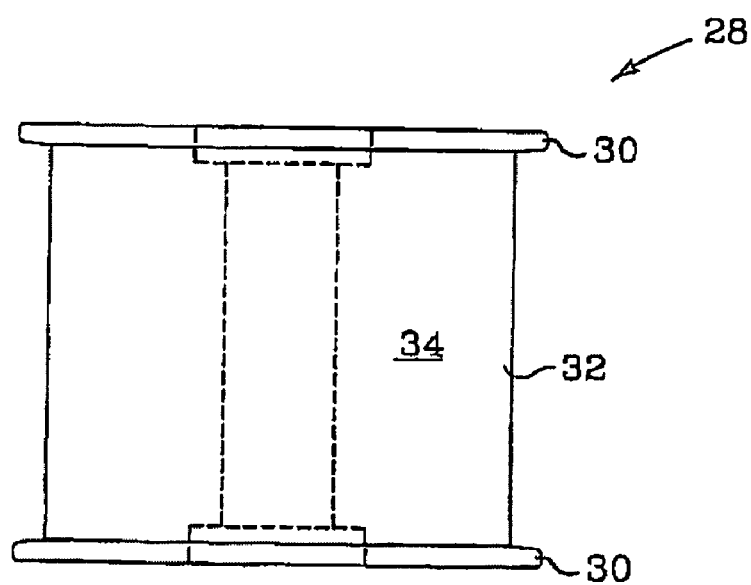

As noted above, FIG. 1 illustrates generally the configuration of a tape drive 10 typical of those used with single spool tape cartridges. Referring again to FIG. 1, a magnetic tape 12 is wound on a single supply spool 14 in tape cartridge 16. Tape cartridge 16 is inserted into tape drive 10 for read and write operations. Tape 12 passes around a first tape guide 18, over a magnetic read/write head 20, around a second tape guide 22 to a take up spool 24. Head 20 is mounted to a carriage and actuator assembly 26 that positions head 20 over the desired track or tracks on tape 12. Head 20 engages tape 12 as tape 12 moves across the face of head 20 to record data on tape 12 and to read data from tape 12.

Figure 5:
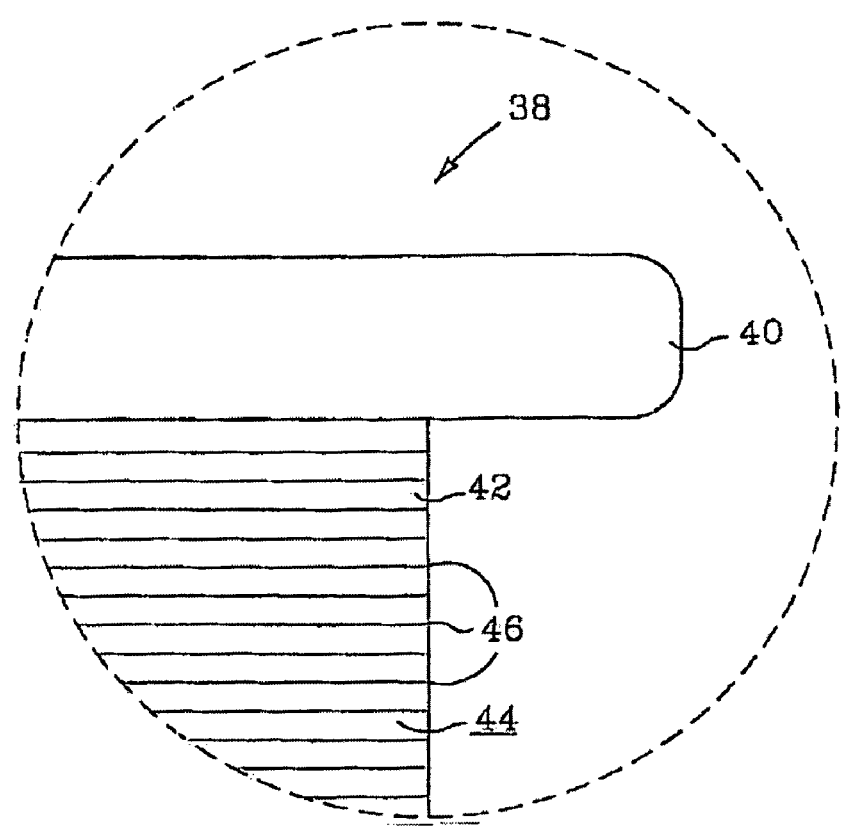
FIG. 5 is a detail view of a portion of the roller guide of FIG. 4 showing the texture in more detail.
Figure 4:
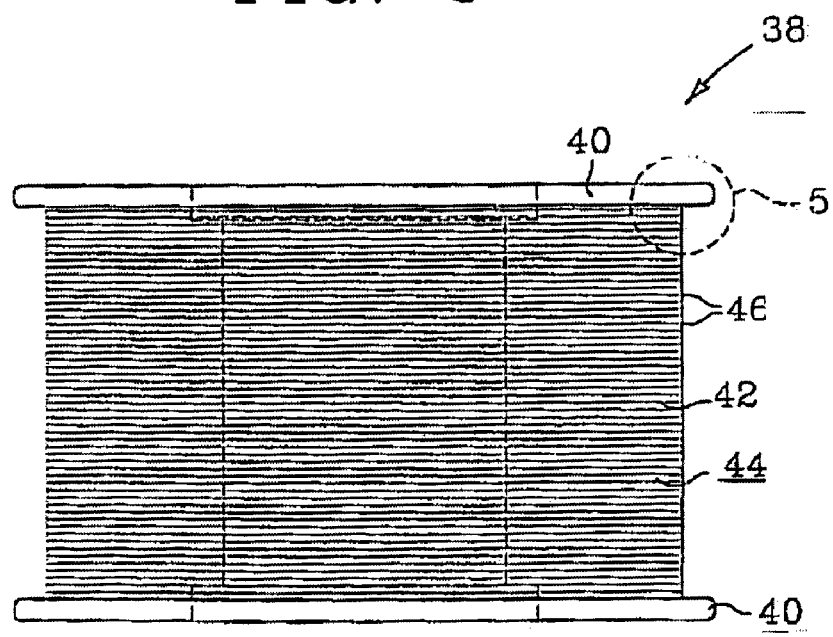
FIG. 4 is an elevation view of a roller tape guide constructed according to one embodiment of the present invention in which a circumferential texture is applied to the surface of the hub.

A tape guide constructed according to one embodiment of the present invention is shown in FIGS. 4-5. Referring to FIGS. 4-5, each roller guide 38 includes disc shaped flanges 40 and an annular hub 42. Tape 12 rides on the outer surface 44 of hub 42. Each flange 40 extends radially past outer surface 44 of hub 42. When roller guide 38 is installed in tape drive 10, for example as guides 18 and 22 in FIG. 1, hub 40 rotates on a fixed pin or axle that extends from the tape drive chassis or other suitable support through the center of hub 40. Ball bearings or like are preferred to reduce friction and minimize wear between hub 40 and the pin or axle on which it turns. Flanges 40 and hub 42 may be machined as a single integral part or as separate parts bonded together A circumferential texture 46 is applied to the outer surface 44 of hub 42 to bleed air from between tape 12 and hub surface 44. Circumferential texture 46 includes a series of shallow grooves or scratches similar to that achieved by placing sand paper with the desired grit size against a turning roller with no lateral motion.

Figure 7:
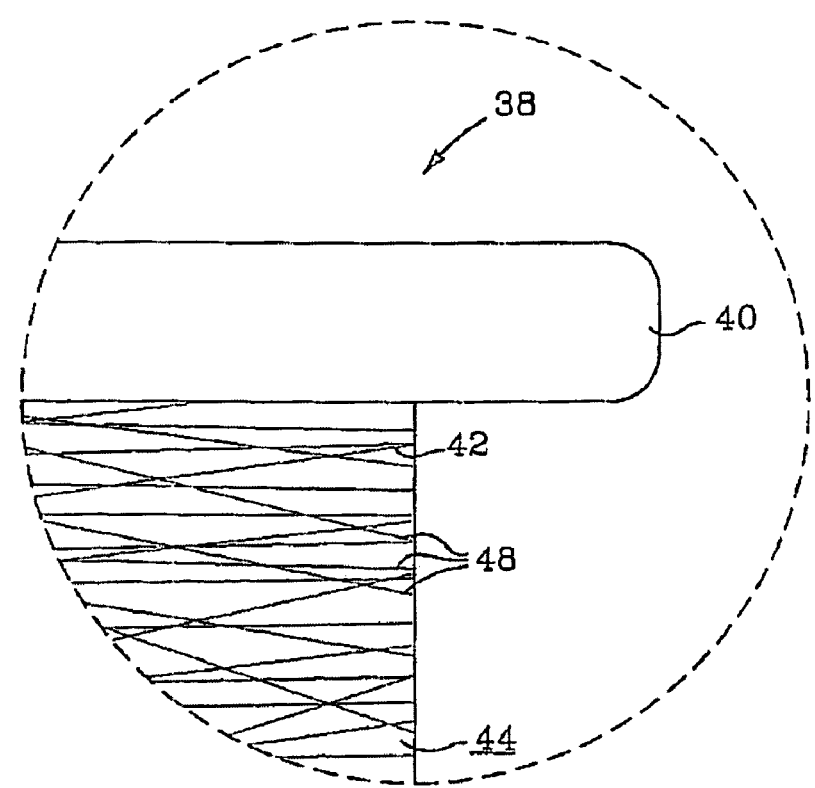
FIG. 7 is a detail view of a portion of the roller guide of FIG. 6 showing the texture in more detail.
Figure 6:
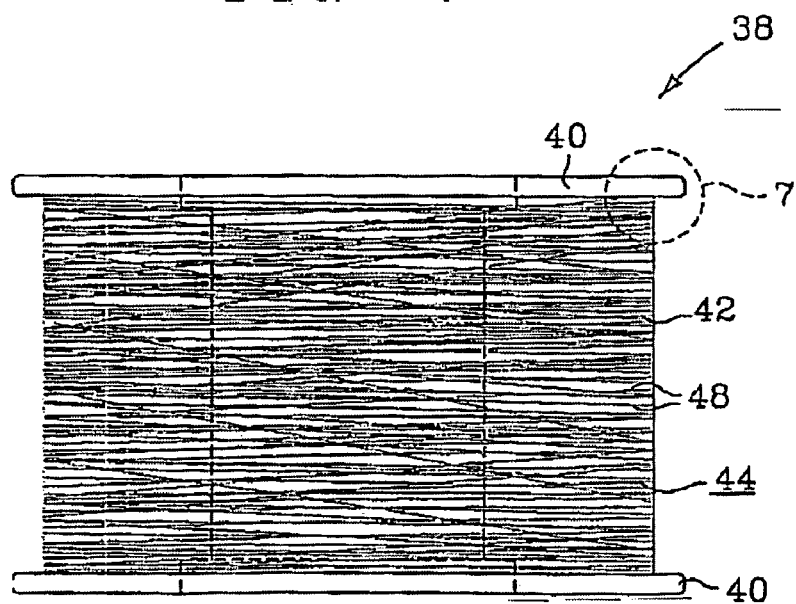
FIG. 6 is an elevation view of a roller tape guide constructed according to another embodiment in which a cross hatched texture is applied to the surface of the hub.
Figure 9:
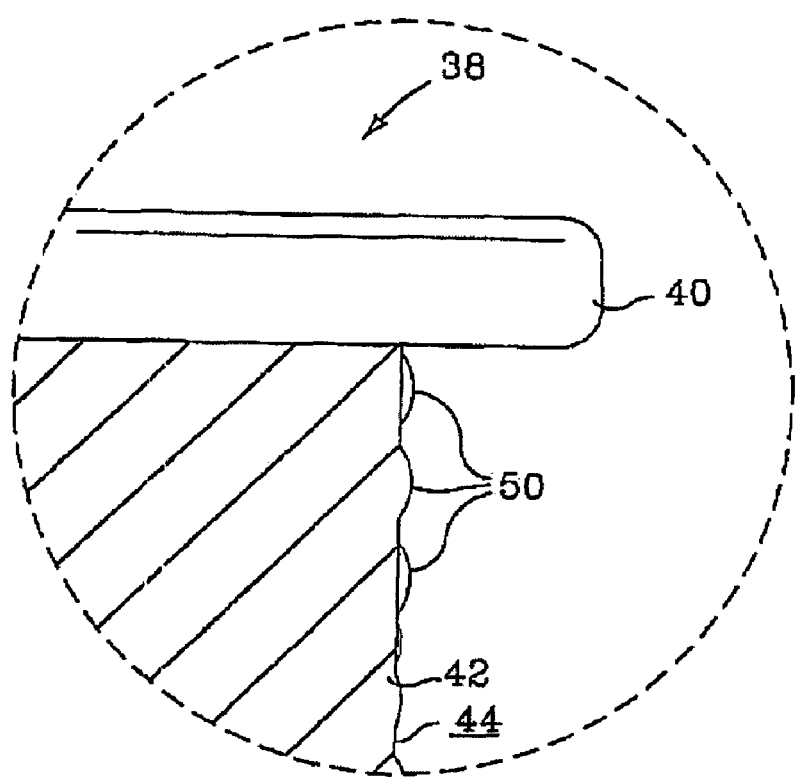
FIG. 9 is a detail view of a portion of the roller guide of FIG. 8 showing the texture in more detail.
Figure 8:
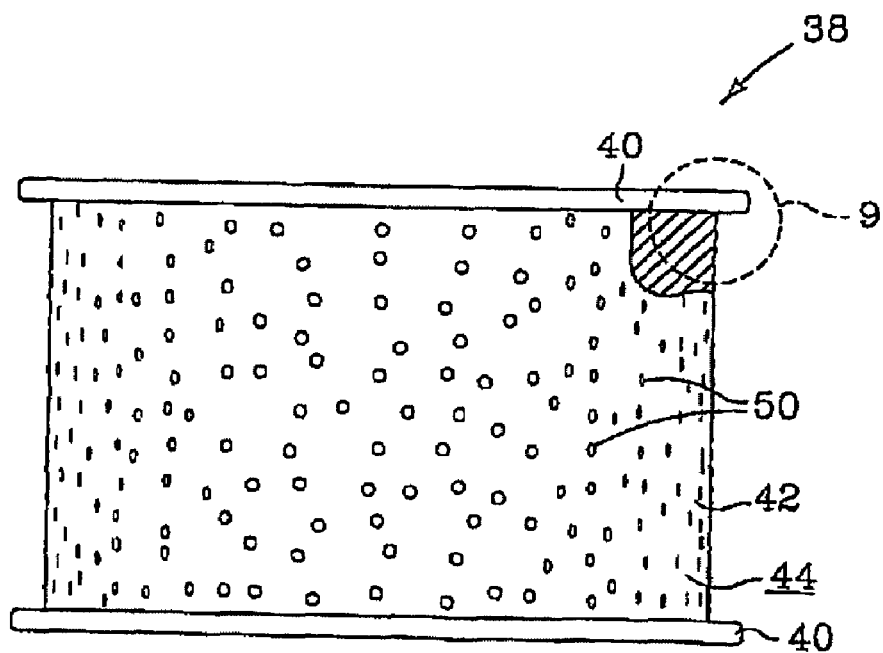
FIG. 8 is an elevation view of a roller tape guide constructed according to another embodiment in which a sputter texture is applied to the surface of the hub.
Figure 11:
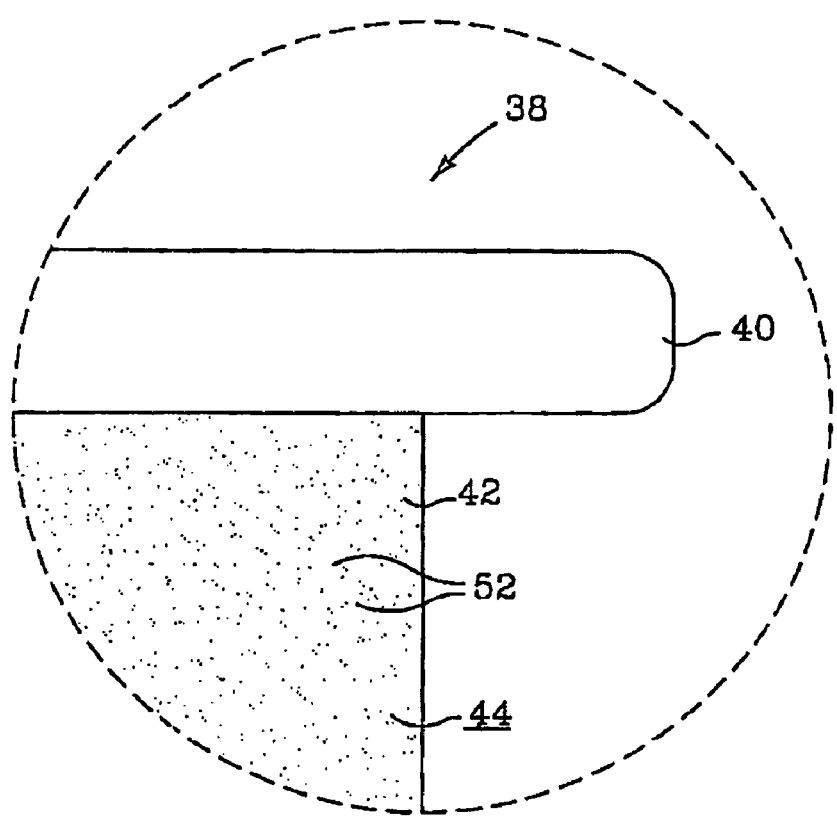
FIG. 11 is a detail view of a portion of the roller guide of FIG. 10 showing the texture in more detail.
Figure 10:
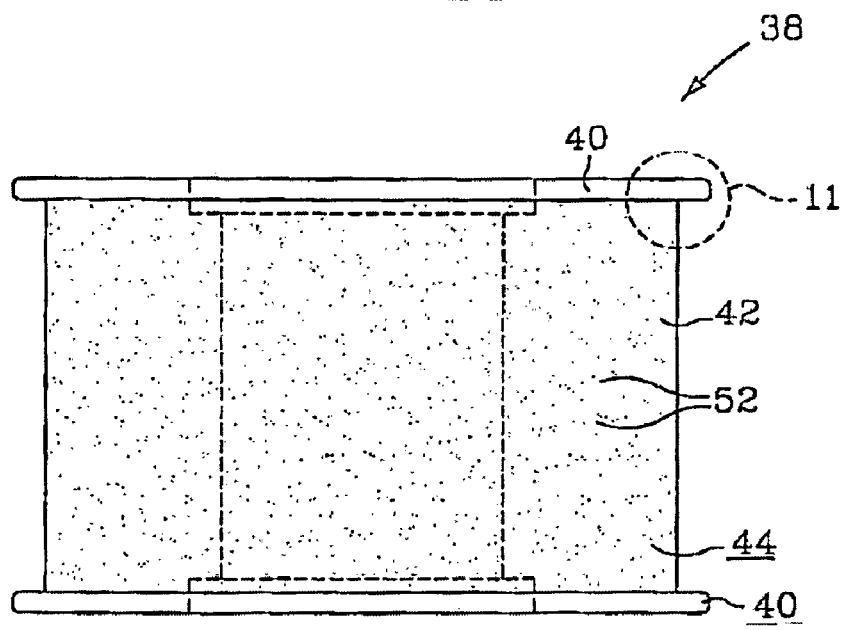
FIG. 10 is an elevation view of a roller tape guide constructed according to another embodiment in which a laser texture is applied to the surface of the hub.
Figure 13:
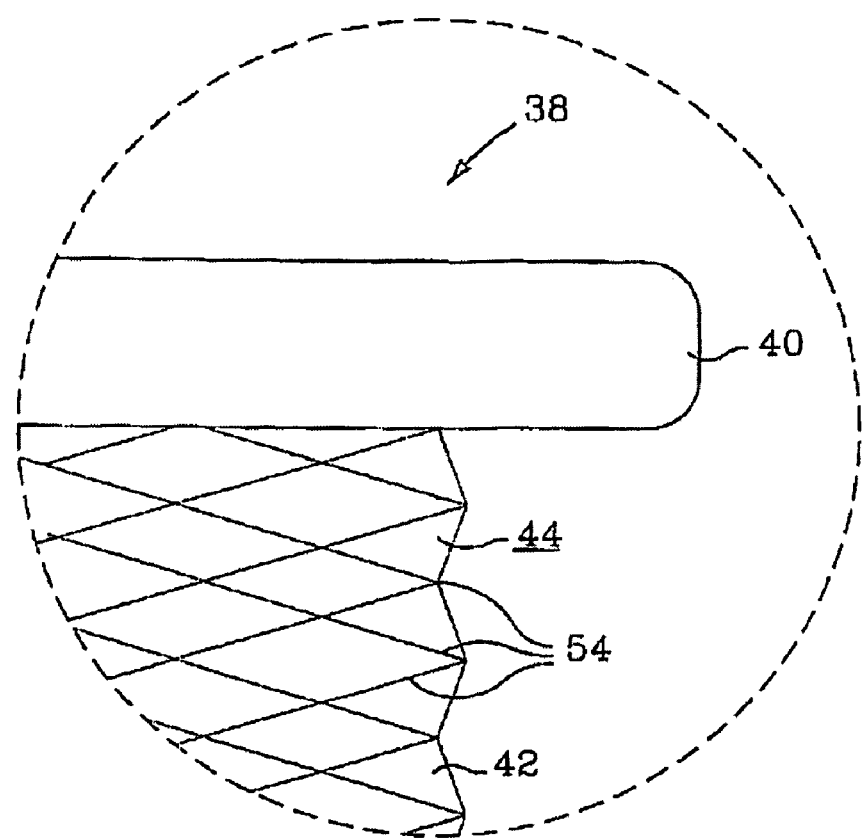
FIG. 13 is a detail view of a portion of the roller guide of FIG. 12 showing the texture in more detail.
Figure 12:
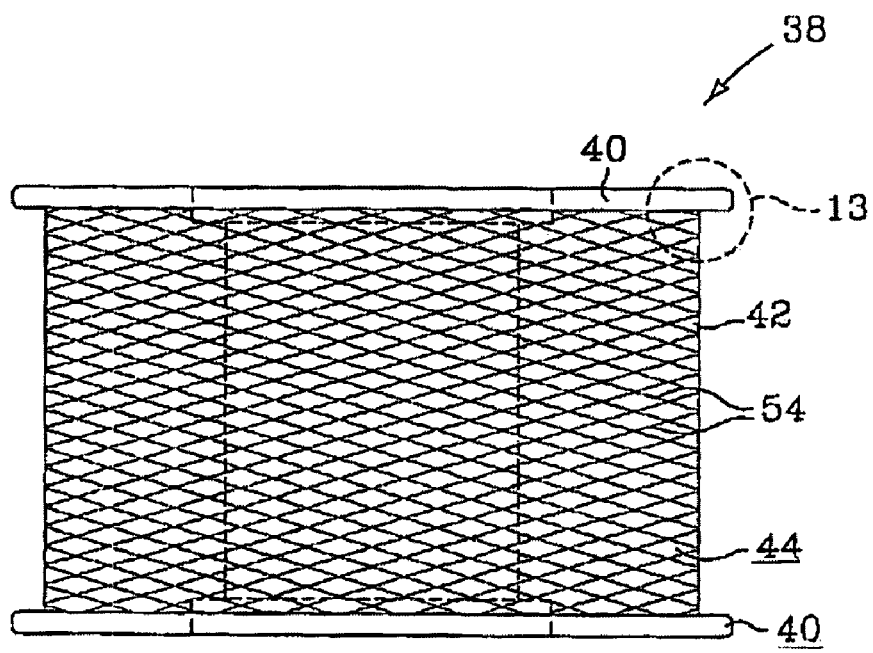
FIG. 12 is an elevation view of a roller tape guide constructed according to another embodiment in which a machined texture is applied to the surface of the hub.

In an alternative embodiment shown in FIGS. 6-7, a cross hatched texture 48 is used. Cross hatched texture 48 includes an array of crossing scratches similar to that achieved by moving sand paper back and forth over a slowly turning roller. In the embodiment shown in FIGS. 8-9, a sputter texture 50 is applied to hub surface 44. Sputter texture 50 includes an array of small bumps similar to that achieved by sputter depositing a texture material on to the guide. In FIGS. 10-11, a laser texture 52 is applied to hub surface 44. Laser texture 52 includes an array of surface irregularities produced by melting and recrystallizing tiny areas on hub surface 44 similar to that achieved with techniques used to produce laser textured recording disks. In FIGS. 12-13, a machined texture 54 is applied to hub surface 44. Machined texture 54 includes a series of ridges or knobs similar to a knurled surface formed at the correct scale to match the desired surface roughness.

In each of the above described embodiments, the surface texture is designed to allow some contact of the tape with the guide by reducing the air bearing. A texture with a surface roughness exceeding the expected flying height of tape 16 above hub surface 44 is necessary to allow some tape to guide contact. For example, for ½ inch type data storage tapes that have a nominal tape width of 12.65 mm moving at about 4.1 m/s with 1N tension, the tape "flies" on an air bearing about 1.3 microns above the surface of the hub. Hence, for this type of tape and operating configuration, the surface roughness of texture 46-54 should be at least 1.3 microns. Although the roughness may be varied as necessary to allow optimum tape to guide contact to achieve the desired damping of lateral movement of the tape, it is expected that textures having a surface roughness of 1-3 microns will have an effect similar to the grooved surface described in the '882 application but without any significant risk of distorting the tape.

While the invention has been shown and described with reference to the surface textures shown in FIGS. 4-13, other suitable textures may be possible. It should be understood, therefore, that variations of and modifications to the textures shown and described may be made without departing from the spirit and scope of the invention which is defined in following claims.

What is claimed is:

1. A tape guide, comprising:
   a hub having a surface over which a tape passes and spaced apart parallel flanges extending out from the hub, the surface comprising a laser texture that includes an array of surface irregularities produced by melting and recrystallizing tiny areas on the surface of the hub.

2. The tape guide of claim 1, wherein the surface irregularities are similar to that achieved with techniques used to produce laser textured recording disks.

3. The tape guide of claim 1, wherein the surface of the hub has a roughness that exceeds a having height of the tape.

4. The tape guide of claim 1, wherein the surface of the hub has a roughness that is between 1.0 microns and 3.0 microns.

5. A roller guide, comprising:
   a hub having a surface over which a tape passes and spaced apart parallel flanges extending out from the hub, the surface comprising a laser texture that includes an array of surface irregularities produced by melting and recrystallizing tiny areas on the surface of the hub.

6. The roller guide of claim 5, wherein the surface irregularities are similar to that achieved with techniques used to produce laser textured recording disks.

7. The roller guide of claim 5, wherein the surface of the hub has a roughness that exceeds a flying height of the tape.

8. The roller guide of claim 5, wherein the surface of the hub has a roughness that is between 1.0 microns and 3.0 microns.

* * * * *

UNITED STATES PATENT AND TRADEMARK OFFICE
CERTIFICATE OF CORRECTION

PATENT NO.         : 7,506,836 B2                                    Page 1 of 1
APPLICATION NO.    : 11/507725
DATED              : March 24, 2009
INVENTOR(S)        : Darrel R. Bloomquist It is certified that error appears in the above-identified patent and that said Letters Patent is hereby corrected as shown below:

In column 4, line 39, in Claim 3, delete "having" and insert -- flying --, therefor.

Signed and Sealed this

Ninth Day of November, 2010

David J. Kappos
*Director of the United States Patent and Trademark Office*